(12) United States Patent
Ward et al.

(10) Patent No.: US 6,812,639 B2
(45) Date of Patent: Nov. 2, 2004

(54) GERMICIDAL LAMP WITH END OF LIFE ARC QUENCHING DEVICE

(75) Inventors: Patrick Ward, West Haven, CT (US); William Sax, Stratford, CT (US)

(73) Assignee: Light Sources, Inc., Orange, CT (US)

( * ) Notice: Subject to any disclaimer, the term of this patent is extended or adjusted under 35 U.S.C. 154(b) by 0 days.

(21) Appl. No.: 10/243,299

(22) Filed: Sep. 13, 2002

(65) Prior Publication Data

US 2004/0051459 A1 Mar. 18, 2004

(51) Int. Cl.⁷ .................................................. H01K 1/50
(52) U.S. Cl. ...................................... 313/578; 313/569
(58) Field of Search ................................. 313/578, 569, 313/567, 610, 613

(56) References Cited

U.S. PATENT DOCUMENTS

| | | | |
|---|---|---|---|
| 3,878,421 A | * 4/1975 | Boehme | 313/578 |
| 4,601,931 A | * 7/1986 | Doyle et al. | 428/34.2 |
| 4,700,101 A | 10/1987 | Ellner et al. | 313/1 |
| 5,705,887 A | 1/1998 | Shaffer | 313/489 |

FOREIGN PATENT DOCUMENTS

WO    WO 81/01244    5/1981

\* cited by examiner

Primary Examiner—Joseph Williams
(74) Attorney, Agent, or Firm—Fattibene & Fattibene; Paul A. Fattibene; Arthur T. Fattibene

(57) ABSTRACT

An end of life quenching device for a vapor lamp preventing damage to the lamp and socket structure. Mica is attached to a lead wire of a filament. As an emission material on the filament is consumed and the vapor lamp reaches the end of its life, the resulting increase in voltage causes an arc. The arc may extend down the lead wire. The hydrated OH group in the mica releases hydrogen, which extinguishes the arc within the vapor lamp. Damage is thereby prevented. The mica withstands the high pressing temperatures required in the manufacture of vapor lamps with quartz envelopes and used to generate ultraviolet radiation in germicidal applications.

13 Claims, 3 Drawing Sheets

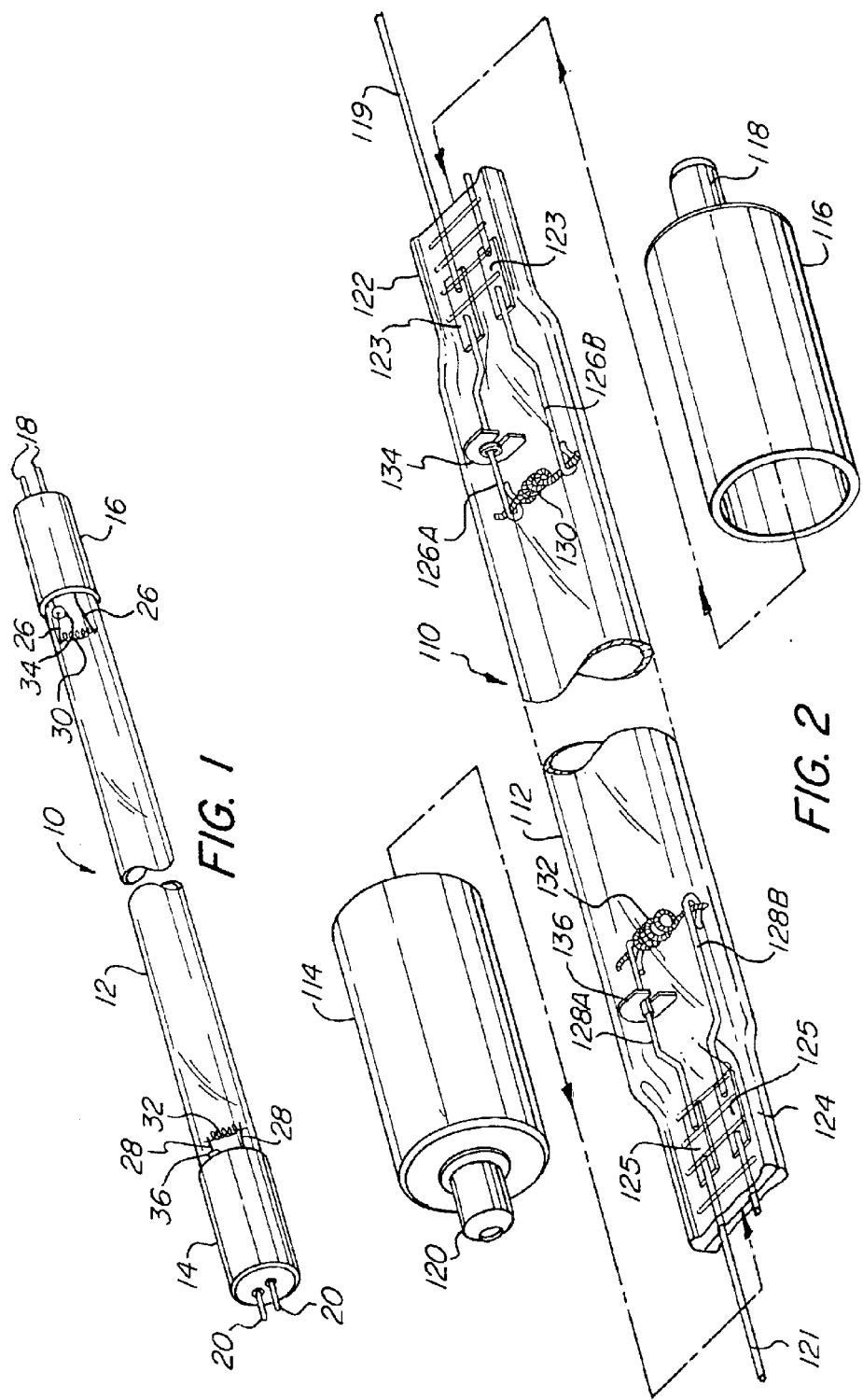

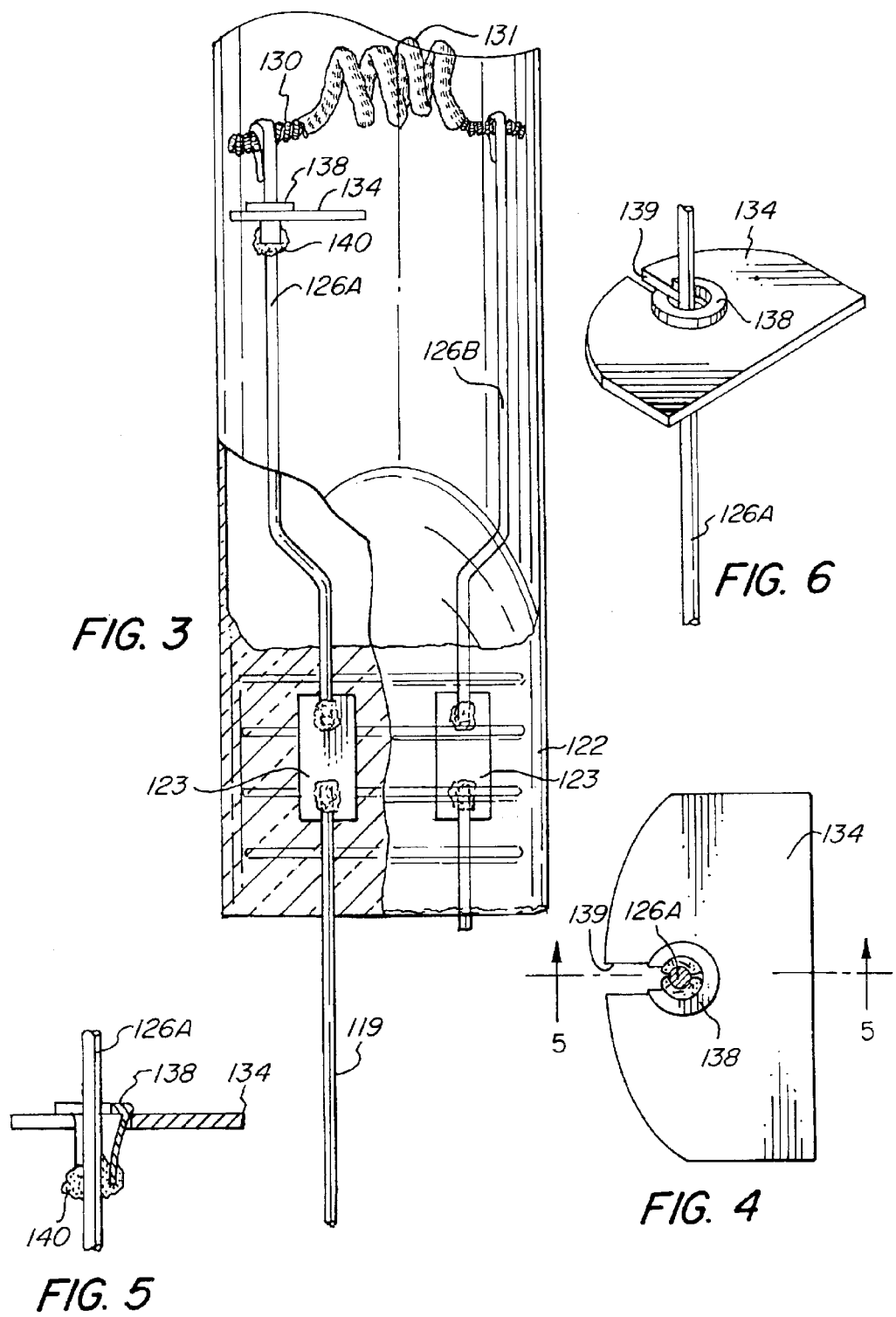

GERMICIDAL LAMP WITH END OF LIFE ARC QUENCHING DEVICE

FIELD OF THE INVENTION

The present invention relates generally to vapor or gaseous discharge lamps, and more particularly to germicidal lamps.

BACKGROUND OF THE INVENTION

All vapor lamps have a limited life. One type of vapor lamp, a low pressure mercury lamp, uses an electrode having emission material thereon. A quartz envelope is used to contain the low pressure mercury within the lamp. Often, the emission material on the electrode is a factor in the life of the lamp and its failure. The emission material is slowly consumed during the operation of the lamp. When the emission material on the electrode is totally consumed, the lamp will reach the end of its life. When the emission material is consumed, there is a sudden increase in cathode fall voltage resulting in a sharp raise in lamp voltage, typically over 100 volts. For lamps having a rapid start or preheat ballast, this voltage increase rises the lamp voltage to a level that approximates the open circuit voltage, and the lamp will shut down. However, in applications where an instant start operation is used, this open circuit voltage is typically three or four times the lamp's operating voltage and the lamp will continue to operate despite the voltage increase. The continued operation of the lamp is not desirable, since the voltage increase will cause a great increase in wattage consumed at the lamp's end. Also, the resulting arc consumes the electrode and support structure. The temperatures at the base will rise to a level sufficient to melt the socket and burn the housing components. The lamp and related structures can be severely damaged if the lamp does not shut down.

There have been several solutions proposed in efforts to solve the uncontrolled operation of a vapor lamp at the end of its life to prevent this destructive and dangerous condition. In the past, thermal fuses have been used in the lamp base. Additionally, electronic shut down circuits that sense increased voltage or rectification have been used. While many of these solutions have been useful, they are often expensive and sometimes do not work properly. One solution that is promising is to utilize an arc quenching device within the lamp itself. As the lamp arcs back to the support structure, the temperature rise may be used to activate a material that raises the voltage by hundreds of volts to effectively shut down the lamp. A hydrogen containing gas may be liberated to cause a great voltage increase and cause the lamp to shut down.

An example of an arc quenching material is disclosed in U.S. Pat. No. 5,705,887 entitled "Fluorescent Lamp With End of Life Arc Quenching Structure" issuing to Schaffer on Jan. 6, 1998. Therein disclosed is a metal hydride material applied to the top of a lamp stem. Upon an increase in temperature at the end of life of the lamp, hydrogen gas is released by the disassociation of the hydride and the lamp is caused to shut down. However, for this solution to be effective, it is important that the hydride not decompose in normal lamp operation and that the temperatures experienced in lamp manufacture not decompose the hydride. Therefore, for many lamps, there is no metal hydride available which can be used.

For example, germicidal lamps or other vapor lamps using a quartz envelope that require sealing temperatures of approximately 1600° C. have special problems. There is no metal hydride which is stable at the sealing temperatures required for the manufacture of lamps having quartz envelopes. Additionally, there is essentially no room or site on the mount structure to apply a coating.

In germicidal lamps, it is particularly important to have a reliable shut down mechanism at the end of life of the lamp. Many germicidal lamps are operated in pressurized sealed vessels for water treatment. The lamp end and sleeves are sealed to the vessels with o-rings or gaskets clamped with compression fittings. If this seal integrity is compromised due to damage as the result of arcing of the vapor lamp at the end of its life, the damage may result in the lamp and sleeve being violently expelled from the vessel, causing injuries, flooding and total system failure. Therefore, there is a need for a safe, reliable and easy to implement arc quenching device for use with germicidal lamps or other lamps utilizing a quartz envelope and requiring high temperatures during manufacture.

SUMMARY OF THE INVENTION

The present invention comprises a vapor lamp or gaseous discharge lamp having a quartz envelope containing a filament and lead wire. The lead wire is held in a stem and coupled to an exterior contact pin. Mica or hydrous aluminum silicate mineral is placed on the lead wire between the filament and the stem. The mica releases hydrogen when subjected to high temperatures, effectively quenching the arc formed at the end of the lamps life.

Accordingly, it is an object of the present invention to prevent damage to a vapor lamp and fixture when the vapor lamp reaches its end of life.

It is a further object of the present invention to provide a simple, inexpensive solution to end of life arcing within a vapor lamp.

It is an advantage of the present invention that it may be used with high sealing temperatures that occur in the manufacture of vapor lamps having quartz envelopes.

It is an advantage of the present invention that it does not affect the normal operation of the vapor lamp.

It is another advantage of the present invention that it can withstand high sealing temperatures required during manufacture of lamps with quartz envelopes.

It is a feature of the present invention that mica is attached to a lead wire below the filament.

It is another feature of the present invention that the mica is held on a lead wire with a ferrule.

These and other objects, advantages, and features will become readily apparent in view of the following more detailed description.

BRIEF DESCRIPTION OF THE DRAWINGS

FIG. 1 is a perspective view of a vapor lamp incorporating the present invention.

FIG. 2 is a perspective view illustrating a single lead vapor lamp embodiment of the present invention.

FIG. 3 is an enlarged view of one end of a single lead vapor lamp.

FIG. 4 is a plan view of the mica assembly of the present invention.

FIG. 5 is a cross section of FIG. 4 along line 5—5.

FIG. 6 is a perspective view of the mica assembly of the present invention.

DETAILED DESCRIPTION OF THE PREFERRED EMBODIMENTS

Figure 2A:
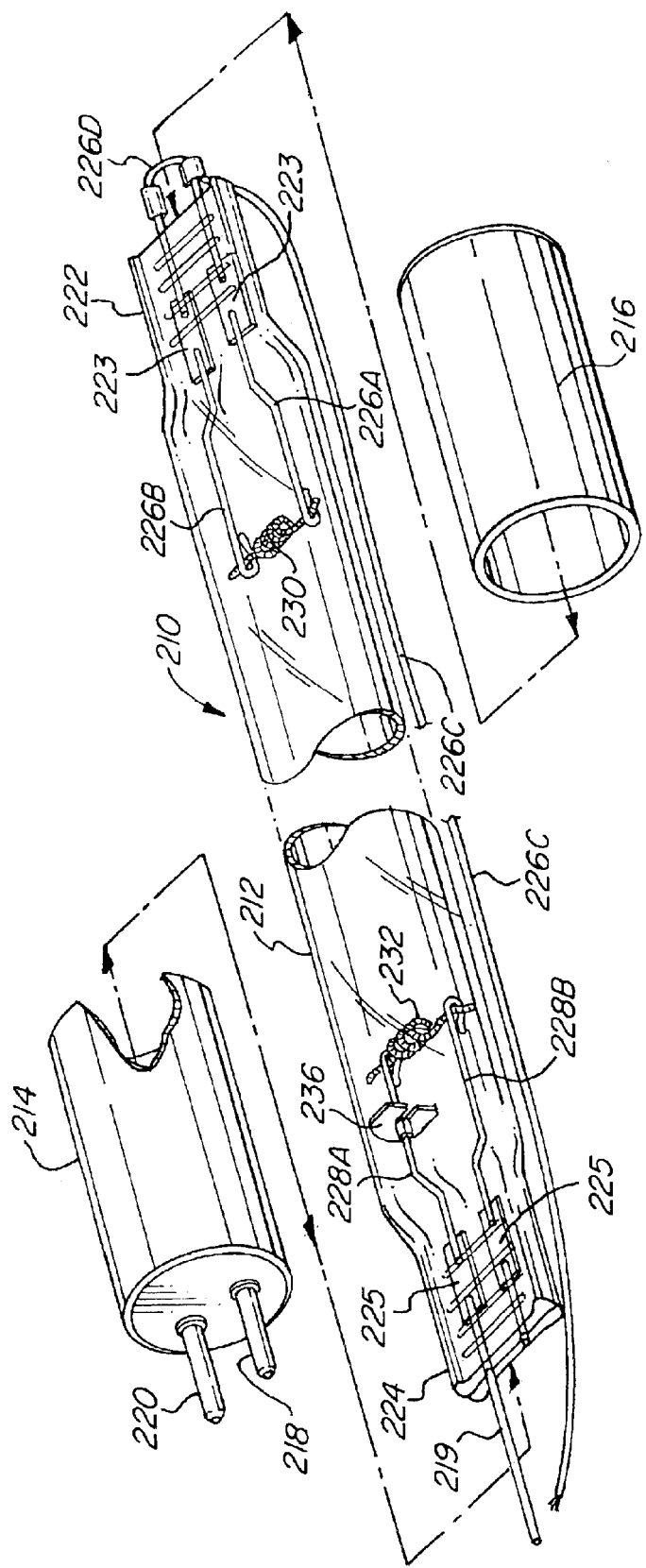
FIG. 2A is a perspective view illustrating a single ended vapor lamp embodiment of the present invention

FIG. 1 is a perspective view illustrating a vapor lamp, such as a fluorescent lamp, which uses a low-pressure mercury arc to produce ultraviolet radiation. The ultraviolet radiation is often utilized in germicidal applications for the disinfecting and treatment of water. The vapor lamp 10 comprises an envelope 12, which is generally made of quartz, with end caps 14 and 16. Contact pins 18 and 20 extend from the end caps 14 and 16 so as to provide an electrical contact. Press sealed ends may be used to seal the envelope 12 forming a pressurized container. Sealed within a portion of the press sealed ends are lead wires 26 and 28. The lead wires are often made of molybdenum or moly. Between each lead wire 26 is a filament 30 coated with an emission material.

Similarly, between the lead wires 28 is another filament 32. Filament 32 is also coated with an emission material. Between the stem 24 and the filament 32 is mica 34. The mica 34 may be made of any of a group of hydrous aluminum silicate minerals. For example, the mica may be muscovite, paragonite, phlogopite, biotite or lepidolite. All of these micas contain an OH group.

FIG. 2 illustrates a single ended vapor lamp. In this embodiment, the vapor lamp 110 has an envelope 112 and end caps 114 and 116 on each end. Contact pins 118 and 120 extend from the end caps 114 and 116. In this embodiment, only a single contact pin for each end of the lamp is used. A press seals 122 and 124 seal each end of the envelope 112. Pressed within the press seal 122 are ribbon wires 123. The ribbon wires 123 are used to facilitate sealing and prevent the possibility of leakage. A lead wire 126A and a lead wire 126B are connected to a respective ribbon wire 123. Lead wire 126A is coupled to the contact pin 118 through contact wire 119. Between the lead wires 126A and 126B is a filament 130. The filament 130 is coated with an emission material. Mica 134 is attached to the lead wire 126A coupled to the pin 118. The lead wire 126B is dead ended within the press seal 122. The mica 134 is positioned between the filament 130 and the press seal 122.

Similarly, at the other end of the vapor lamp 110 are lead wires 128A and 128B. Lead wire 128A is coupled to pin 120 through contact wire 121 and lead wire 128B is dead ended within the press seal 124. Ribbon wires 125 are used to facilitate sealing. Filament 132 is connected between the lead wires 128A and 128B. Mica 136 is attached to the lead wire 128A coupled to the contact pin 120. The mica 136 is placed between the filament 132 and the press seal 124. The filament 132 has an emission material thereon.

The lamp illustrated in FIG. 2A has a construction such that the contact pins only come out of one end of the lamp. A wire extends from one end of the lamp to the other to provide an electrical coupling for the other filament. A similar construction is illustrated in U.S. Pat. No. 4,701,101 entitled "Elongated Tubular Lamp Construction" issuing to Ellner et al on Oct. 13, 1987, which is herein incorporated by reference in its entirety. This embodiment permits the lamp to be electrically connected to a socket or fixture at one end only.

In FIG. 2A the vapor lamp 210 has an envelope 212 and end caps 214 and 216 on each end. Contact pins 218 and 220 extend from end cap 214. Wire 226C connects lead wire 226A to pin 218. Only a single contact pin for each end of the lamp is used, with both contact pins 218 and 220 at a single end of the vapor lamp 210. Press seals 222 and 224 seal each end of the envelope 212. Pressed within the press seal 222 are ribbon wires 223 coupled to a lead wire 226A and a lead wire 226B. Lead wire 226A is coupled to the contact pin 218 through wire 226C. A shunt wire 226D couples the lead wires 226A and 226B together. Between the lead wires 226A and 226B is a filament 230. The filament 230 is coated with an emission material. Mica need not be placed at this end since an end of life failure at this end will not destroy seals on the system. However, if desired and for added protection, mica may be placed at this end also.

Similarly, at the other end of the vapor lamp 210 are lead wires 228A and 228B. Lead wire 228A is coupled to pin 220 and lead wire 228B is dead ended within the press seal 224. Pressed within the press seal 224 are ribbon wires 225. Lead wire 228A is coupled to a contact wire 219 through a ribbon wire 225. Filament 232 is connected between the lead wires 228A and 228B. Mica 236 is attached to the lead wire 228A coupled to the contact pin 220. The mica 236 is placed between the filament 232 and the press seal 224. The filament 232 has an emission material thereon.

FIG. 3 is an enlarged view of one end of the electrode assemblies illustrated in FIG. 2. The lead wires 126A and 126B are pressed within the press seal 122. Between the lead wires 126A and 126B is placed filament 130. On filament 130 is an emission material 131. Attached to or placed on the stem 126A is mica 134. The mica 134 has an opening therein through which a split ferrule 138 is placed. The ferrule 138 holds the mica 134. The ferrule 138 is then spot welded to the lead wire 126A with weld 140. The ferrule 138 may be made of a metal. Other materials or equivalent techniques may be used to hold mica 134 on the lead wire 126A. The mica 134 may also be directly attached to the lead wire 126A by any suitable adhesive or other equivalent material.

FIG. 4 is a plan view illustrating the attachment of the mica 134. In this view, a slot 139 in the mica 134 is more clearly illustrated. The slot 139 facilitates placement of the mica 134 on the lead wire 126A. Additionally, the split in the split ferrule 138 is better illustrated. The split in the ferrule 138 also facilitates placement of the mica assembly on the lead wire 126A.

FIG. 5 is a cross section taken along line 5—5 in FIG. 4. Ferrule 138 extends through an opening within the mica 134. The ferrule 138 is attached to the mica 134 by a press fit or by crimping and the ferrule 138 is attached to the lead wire 126A with a spot weld 140. It should be appreciated that the mica 134 may be attached to the lead wire 126A by any suitable means or equivalent techniques well known to those skilled in the art. The ferrule 138 may be made from any suitable material.

FIG. 6 is a perspective view illustrating the mica assembly. The mica assembly comprises mica 134 and attached split ferrule 138. Mica 134 has a slot 139 therein. While the shape of the mica 134 is illustrated as generally rectangular with a curved edge, the mica 134 may have other shapes, for example round or square. The curved edge of the mica 134 conforms to the tubular lamp envelope.

In operation, when the emission material 131 contained on filament 130 is consumed, the lamp has reached its end of life. At the end of life of the vapor lamp, the cathode fall voltage increases suddenly. This causes an arc to extend down the support structure. As the arc extends down the lead wire 126A, made of molybdenum, the arc hits the mica 134. The high temperatures generated liberate the water from the mica 134, which extinguishes the arc. The mica 134 is substantially unaffected by the high temperatures needed in the manufacture of quartz lamps. During pressing of the lamp and sealed ends, the entire mount becomes red hot, but the mica remains intact. While some of the hydrated water is liberated during pressing, enough remains to quench the arc at the end of life of the vapor lamp.

The present invention has been subjected to severe testing. In one test, lamps were made with only a small amount of emission material, less than 0.1% of normal, giving a life of approximately 10 hours, to simulate an end of life event. The mica was then mounted on a lead wire and the lamp press sealed. During pressing, the mica was subjected to very high temperatures to which previously used metal hydride materials would not have withstood. The lamp was operated with an instant start ballast with an open circuit voltage of 800 volts. A 50 volt lamp operating with this open circuit voltage of 800 volts resulted in the arc to be extinguished as the arc burned back to the mica. Accordingly, the lamp voltage can be increased substantially without a catastrophic failure, breakage or damage to the lamp or socket structure. The present invention utilizes mica in a vapor lamp in a new and unique way without affecting the electrical output characteristics of the vapor lamp. The mica, when subjected to high temperatures, results in the liberation of hydrogen from the hydrated OH group in the mica that successfully extinguishes an arc and shuts down the vapor lamp at its end of life. The mica is able to withstand the very high temperatures needed in the manufacture of germicidal lamps having quartz envelopes, or other materials needing high temperatures for manufacture.

While the present invention has been illustrated with respect to several embodiments, it should readily be appreciated by those skilled in the art that various modifications may be made without departing from the spirit and scope of this invention.

What is claimed is:

1. A germicidal low pressure mercury lamp comprising:
   a quartz envelope having a first and second end;
   a seal sealing the first and second ends of said quartz envelope;
   a pair of lead wires pressed within each of said quartz seals;
   a contact pin coupled to each of said pair of lead wires;
   a filament placed between each of said pair of lead wires;
   an emission material placed on said filament; and
   mica attached to one of said pair of lead wires only between said seal and said filament,
   whereby an arc formed at the end of life of the vapor lamp is quenched preventing damage.

2. A germicidal low pressure mercury lamp as in claim 1, wherein:
   said mica is selected from the group consisting of muscovite, paragonite, phlogophite, biotite, and lepidolite.

3. A germicidal low pressure mercury lamp comprising:
   a quartz envelope having a first and second end;
   a quartz seal sealing the first and second ends of said quartz envelope;
   a pair of lead wires pressed within each of said quartz seal;
   a contact pin coupled to each of said pair of lead wires;
   a filament placed between each of said pair of lead wires;
   an emission material placed on said filament;
   mica having a opening therein; and
   a ferrule placed within the opening in said mica, said ferrule attached to one of said pair of lead wires between said quartz seal and said filament,
   whereby an arc formed at the end of life of the vapor lamp is quenched preventing damage.

4. A germicidal low pressure mercury lamp as in claim 3 wherein:
   said mica is selected front the group consisting of muscovite, paragonite, phlogophite, biotite, and lepidolite.

5. A germicidal low pressure mercury lamp as in claim 3 wherein:
   said ferrule is made of metal.

6. A germicidal low-pressure mercury lamp for use in a water purification system comprising:
   a tubular quartz envelope having a first and second end;
   a first quartz seal sealing the first end of said tubular quartz envelope;
   a second quartz seal sealing the second end of said tubular quartz envelope;
   a first pair of lead wires pressed within the first quartz seal;
   a first filament placed between said first pair of lead wires;
   a second pair of lead wires pressed within the second quartz seal;
   a second filament placed between said second pair of lead wires;
   a first contact pin coupled to one of said first pair of lead wires;
   a second contact pin coupled to one end of said second pair of lead wires, said first and second contact pins placed at the first end of said tubular quartz envelope;
   a conductor coupling said second pair of lead wires to said second contact pin; and
   a mica assembly attached to one of said first pair of lead wires only coupled to said first pin, said mica assembly attached only to the one of said first pair of lead wires between said first quartz seal and said first filament;
   whereby an arc formed at the end of life of the vapor lamp is quenched preventing damage.

7. A germicidal low pressure mercury lamp as in claim 6 wherein:
   the mica in said mica assemblies is selected from the group consisting of muscovite, paragonite, phlogophite, biotite, and lepidolite.

8. A germicidal low pressure mercury lamp for use in a water purification system comprising:
   a tubular quartz envelope having a first and second end;
   a first quartz seal sealing the first end of said tubular quartz envelope;
   a second quartz seal sealing the second end of said tubular quartz envelope;
   a first pair of lead wires pressed within the first quartz seal;
   a first filament placed between said first pair of lead wires;
   a second pair of lead wires pressed within the second quartz seal;
   a second filament placed between said second pair of lead wires;
   a first contact pin coupled to one of said first pair of lead wires;
   a second contact pin coupled to one end of said second pair of lead wires, said first and second contact pins placed at the first end of said tubular quartz envelope;
   a conductor coupling said second pair of lead wires to said second contact pin; and a mica assembly comprising a ferrule attached to one of said first and second pair of lead wires coupled to said first pin, said mica assembly attached to the one of said first pair of lead wires between said first quartz seal and said first filament, whereby an arc formed at the end of life of the vapor lamp is quenched preventing damage.

9. A germicidal low pressure mercury lamp as in claim 8 wherein:

the ferrule is made of metal.

10. A germicidal low pressure mercury lamp as in claim 8 wherein:

the ferrule comprises a split ferrule.

11. A germicidal low pressure mercury lamp as in claim 8 wherein:

the mica of said mica assembly comprises a substantially rectangular shape with one curved edge.

12. A germicidal low pressure mercury lamp for use in a water purification system comprising:

a tubular quartz envelope having a first and second end;

a first quartz seal sealing the first end of said tubular quartz envelope;

a second quartz seal sealing the second end of said tubular quartz envelope;

a first pair of lead wires pressed within the first quartz seal;

a first filament placed between said first pair of lead wires;

a second pair of lead wires pressed within the second quartz seal;

a second filament placed between said second pair of lead wires;

first contact pin coupled to one of said first pair of lead wires;

a second contact pin coupled to one end of said second pair of lead wires, said first and second contact pins placed at the first end of said tubular quartz envelope;

a conductor coupling said second pair of lead wires to said second contact pin; and a mica assembly attached to one of said first pair of lead wires coupled to said first pin, said mica assembly attached to the one of said first pair of lead wires between said first quartz seal and said first filament, wherein said mica assembly comprises:

a planar piece of mica having a substantially rectangular shape with one curved edge;

a slot extending from the one curved edge;

a split ferrule placed in said slot; and a weld holding said split ferrule to one of said first pair of lead wires, whereby an arc formed at the end of life of the vapor lamp is quenched preventing damage.

13. A method of extinguishing an arc in a vapor lamp comprising the steps of:

pressing a lead wire in a seal;

attaching a filament to the lead wire;

placing an emission material on the filament;

placing mica between the filament and the seal; and operating the vapor lamp until the emission material on the filament is consumed and an arc extends down the lead wire, whereby heat caused by arcing near the mica results in the arc being extinguished within the vapor lamp.

* * * * *